US00RE34420E

United States Patent [19]

Darling

[11] E Patent Number: Re. 34,420

[45] Reissued Date of Patent: Oct. 26, 1993

[54] SPORTS RACQUET

[76] Inventor: James P. Darling, 316½ 8th St., Seal Beach, Calif. 90740

[21] Appl. No.: 616,649

[22] Filed: Nov. 21, 1990

Related U.S. Patent Documents

Reissue of:

[64] Patent No.: 4,786,055
Issued: Nov. 22, 1988
Appl. No.: 876,982
Filed: Jun. 19, 1986

[51] Int. Cl.[5] ..... A63B 51/10

[52] U.S. Cl. ..... 273/73 D

[58] Field of Search ..... 273/73 R, 73 C, 73 D, 273/73 E, 73 G, 73 H

[56] References Cited

U.S. PATENT DOCUMENTS

| | | | |
|---|---|---|---|
| 840,467 | 1/1907 | Beard | 273/73 D |
| 971,773 | 10/1910 | Mueller | 273/73 D |
| 1,526,734 | 2/1925 | Andrews et al. | 273/73 D |
| 1,697,814 | 1/1929 | Forbes | 273/73 D |
| 3,545,756 | 12/1970 | Nash | 273/73 D |
| 3,702,189 | 11/1972 | Galich | 273/73 D |
| 3,884,467 | 5/1975 | Sommer | 273/73 H X |
| 3,926,431 | 12/1975 | Delorean | 273/73 D |
| 3,930,648 | 1/1976 | Brown | 273/73 D |
| 3,986,716 | 10/1976 | Taussig et al. | 273/73 C |
| 3,999,756 | 12/1976 | Head | 273/73 C |
| 4,131,279 | 12/1978 | Ogden | 273/73 D |
| 4,140,316 | 2/1979 | Coupar | 273/73 A |
| 4,184,679 | 1/1980 | Mishel | 273/73 D |
| 4,309,033 | 1/1982 | Parker, Jr. et al. | 273/73 D |
| 4,330,132 | 5/1982 | Ferrari | 273/73 D |
| 4,333,649 | 6/1982 | Vaughn et al. | 273/73 D |
| 4,366,959 | 1/1983 | Lacoste | 273/73 D |
| 4,408,760 | 10/1983 | Ferrari | 273/73 D |
| 4,440,392 | 4/1984 | Popplewell | 273/73 C |
| 4,441,712 | 4/1984 | Guthke | 273/73 D |
| 4,458,898 | 7/1984 | Boden | 273/73 D |
| 4,462,591 | 7/1984 | Kenworthy | 273/73 D |
| 4,462,592 | 7/1984 | Legger et al. | 273/73 D |
| 4,595,201 | 6/1986 | Fischer | 273/73 E |
| 4,681,319 | 7/1987 | Zilinskas | 273/DIG. 23 |
| 4,732,384 | 7/1988 | Seymour | 273/73 |
| 4,761,007 | 8/1988 | Boschian | 273/73 |
| 4,765,621 | 8/1988 | Game | 273/73 |
| 4,776,590 | 8/1988 | Krent et al. | 273/73 |

FOREIGN PATENT DOCUMENTS

| | | | |
|---|---|---|---|
| 4305 | of 1914 | United Kingdom | 273/73 D |

*Primary Examiner*—Millin V.
*Assistant Examiner*—William E. Stoll
*Attorney, Agent, or Firm*—Poms, Smith, Lande & Rose

[57] ABSTRACT

An improved sports racquet is provided having elements placed between the outer edge of the frame and the strings. The elements prevent the strings from touching the outer edge of the frame and rotate in response to a force applied in a direction generally perpendicular to the strings, thereby expanding the sweet spot, providing improved playability of the racquet, and significantly reducing the [fibration] *vibration* that is transferred to the player's arm. The elements are preferably spherical in shape and may be comprised of various materials, including acetal, plastic and metal. The elements preferably rest in receptacles in the racquet frame, which may be integral with the frame or separate pieces, such as sleeves or grommets, that are connected to the frame. The receptacles are preferably designed to have a surface with substantially the same curvature as the bottom surface of the elements.

23 Claims, 2 Drawing Sheets

SPORTS RACQUET

Matter enclosed in heavy brackets [ ] appears in the original patent but forms no part of this reissue specification; matter printed in italics indicates the additions made by reissue.

*The application is a reissue of 06/876982 filed Jun. 19, 1986 patent No. 4,786,055.*

BACKGROUND OF THE INVENTION

Racquet sports such as tennis, racquetball and squash have become extremely popular throughout the world over the past few decades. All three of these sports are played with a racquet generally having a handle, a frame and strings interwoven through the frame to form a playing surface. The players direct a ball, different for each sport, to a desired location by striking the ball with the playing surface of the racquet formed by the strings.

The power and control of a given racquet are dependent on many factors, including the size, weight and shape of the racquet, the materials from which the racquet and strings are made, and the tension of the strings in the racquet frame. It is naturally desirable to optimize both power and control, but one problem with racquet development is that racquet and string configurations which optimize power often sacrifice control, and vice-versa.

Generally speaking, there is a particular area on every racquet, usually near and surrounding the center, in which it is desirable to hit the ball for maximum power and control. This area is known as the "sweet spot." The location and shape of the sweet spot varies with racquet shape and design, but is desirable on all racquets to have a sweet spot that is as large as possible.

Another problem with sports racquets generally is that the force of the ball striking the strings causes a vibration in the racquet frame, particularly when the ball strikes the playing surface outside of the sweet spot. This vibration is transferred from the racquet frame to the arm of the person using the racquet. Extended play often causes serious health problems, particularly to the elbow of the playing arm because of the vibration just described. Among tennis players, this condition is commonly known as "tennis elbow."

Various attempts have been made to both improve playability of sports racquets and lessen the vibration that is transferred to the player's arm upon contact of the racquet with the ball, particularly when the ball strikes outside of the sweet spot. For example, materials have been placed between the outer edge of the racquet frame and the strings to dampen vibration. These arrangements are not particularly effective, however, because these materials are in a fixed position relative to the frame and the strings when the racquet is being used. Thus, vibration is transferred directly from the strings, through the intermediate materials, to the racquet frame, and then to the player's arm. Designs have also been developed that permit the tension of each string to be adjusted individually, purportedly allowing the playability of a racquet to be tailored to each player. This design, however, has the disadvantage of being cumbersome to implement, since the precise effect of adjusting each string is difficult to determine, and because each string must be constantly adjusted to maintain the desired tension profile. Additionally, racquet stringers are adverse to using many individual strings to string a racquet, since the usual procedure is to weave a single string through the racquet frame to form the playing surface.

What is needed, therefore, [an] *is* an inexpensive and simple design for a sports racquet with an expanded sweet spot that provides improved power and control and lessens the vibration to the player's arm caused by impact of the strings with the ball. The racquet of the present invention satisfies these needs and provides other related advantages.

SUMMARY OF THE INVENTION

The present invention resides in an improved sports racquet having elements spaced between the strings and the outer edge of the racquet frame. These elements isolate the strings from the frame and move in response to a force applied to the strings from a generally perpendicular direction. The improved racquet exhibits substantially improved playability, primarily because of an increase in the area of the sweet spot, and significantly reduces the amount of vibration from impact of the ball on the strings that is transferred to the player's arm. The elements of the present invention can be used with any sports racquet having strings, including but not limited to tennis, racquetball and squash, and may either be placed on racquets before initial sale or added to racquets already in the hands of the public.

More specifically, the sports racquet of the present invention is of a conventional type having a handle and a generally circular or oval frame attached thereto. A playing surface is formed in the area within the frame by taking a single string and passing it alternately through spaced passages running from the outer perimeter to the inner perimeter of the frame. A plurality of strings may also be used. For convenience, the playing surface will be referred to as "the strings," irrespective of whether one string or a plurality of strings forms the playing surface.

In a conventional racquet, the strings pass through a spaced passage in the frame from the inside to the outside, and then back through one of the immediately adjacent spaced passages from the outside to the inside. Thus, the strings rest directly on the outer perimeter of the frame between the adjacent spaced passages. In the racquet of the present invention, elements having passages therein are placed on the outer perimeter of the frame, having their passages aligned with the respective passages in the frame. The strings run through each spaced passage in the frame, through an element, then through another element and back through the frame.

The elements of the present invention are preferably spherical in shape, but may be of any shape having a curvilinear surface in contact with the racquet frame, such as [elliptical] *ellipsoidal* or hemispherical. The elements fit into correspondingly shaped receptacles in the frame and rotate within those receptacles in response to a force applied to the playing surface. The receptacles may be formed integrally into the frame, or may be separate sleeves or a [continous] *continuous* grommet having a curvilinear surface therein for receiving said elements. Preferably, the sleeves or grommets should be made of materials having hardness properties similar to those of the elements so that the separate receptacles and the elements will wear evenly over time from the rotation of the elements within the receptacles.

A sleeve may also extend inward from the element. Varying the length of the sleeve changes the action on the strings by changing the rotation of the elements, the striking force being the same.

The elements and receptacles may be made of materials of varying hardness, including but not limited to plastics, acetal or metal, or a composite thereof. The passage running through each element may be radial or curved, and may be drilled by conventional means.

In the case of spherical elements, the elements may be from one eighth inch to one half inch in diameter. Generally, the smaller the element, the greater the rotation that will occur in response to a given force applied to the playing surface.

When the racquet of the present invention is in use, the ball strikes the playing surface and some of the elements rotate in their receptacles, depending on the location in which the ball strikes the playing surface. Without being limited to any particular theory, it is surmised that the rotation of the elements allows the strings to move further in response to a given force, thereby providing greater power and control. Moreover, the elements are believed to rotate to a greater degree as the location of the application of the force moves closer to the edge of the frame, thereby expanding the area of the sweet spot.

Additionally, the elements serve to isolate the strings from the frame and, by rotating in response to a force striking the playing surface, to dissipate the vibration caused by this force striking the playing surface.

Other features and advantages of the present invention will become apparent from the following detailed description, which, taken in conjunction with the accompanying drawings, illustrates, by way of example, the principles of the invention.

DETAILED DESCRIPTION OF THE INVENTION

The present invention is embodied in elements that are placed between the strings and the frame of a conventional sports racquet. The elements rotate in response to a force striking the playing surface of the racquet, thereby increasing the area of the sweet spot and thus improving playability of the racquet, as well as dissipating the vibration caused by a ball striking the playing surface. Moreover, the elements of the present invention are inexpensive to produce and simple to install, providing an inexpensive and easy way to improve the playability of any sports racquet and lessen the vibration that is transferred to the player's arm.

Figure 1:
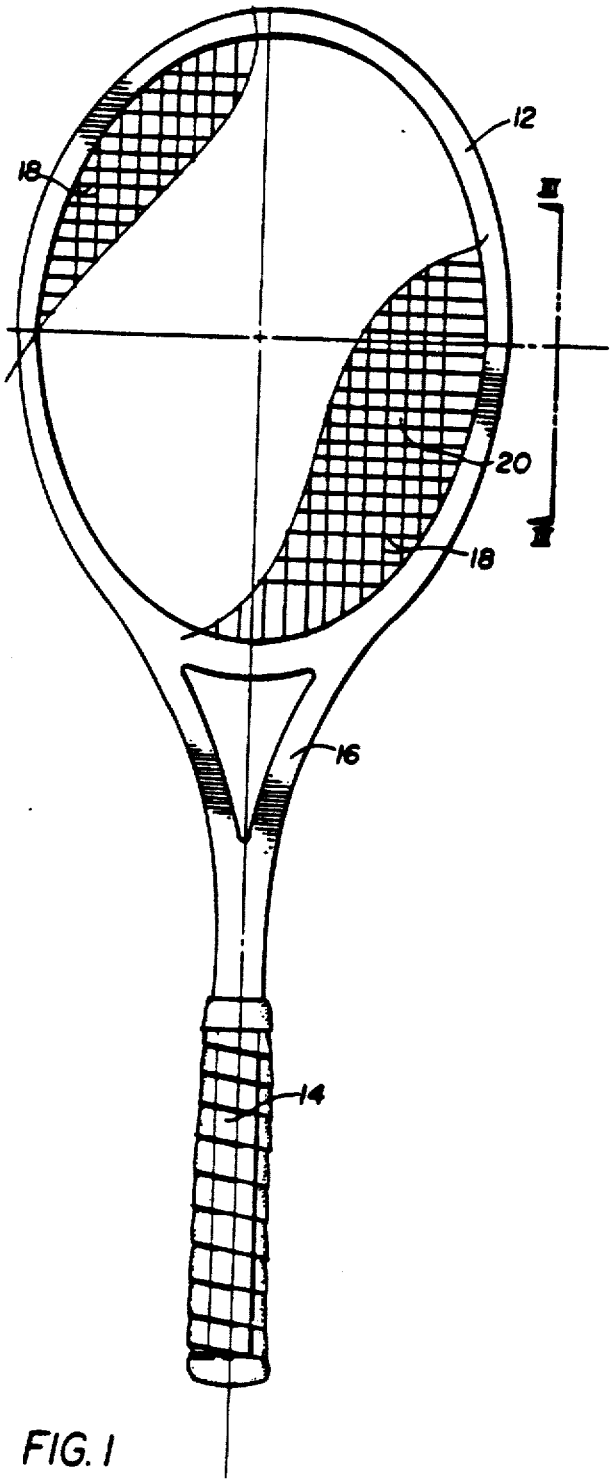
FIG. 1 is a front view of the sports racket of the present invention.

Referring now to the drawings, FIG. 1 shows a tennis racquet 10 having a frame 12 and a handle 14. The handle 14 is connected to the frame 12 by means of a neck 16. Strings 18 are interwoven transversely and longitudinally within frame 12, thereby creating playing surface 20. The playing surface 20 may be comprised of one string or a plurality of strings, but in both cases will be referred to as "strings."

Figure 2:
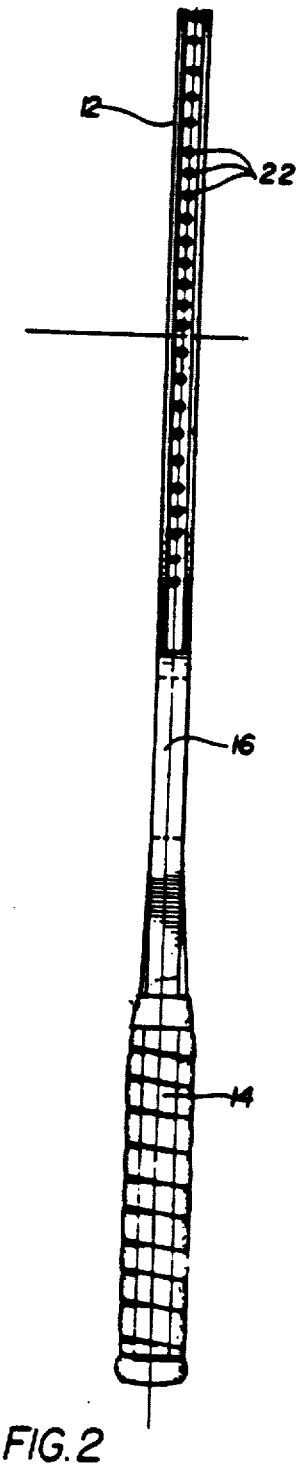
FIG. 2 is a side view of the sports racquet of the present invention.
Figure 3:
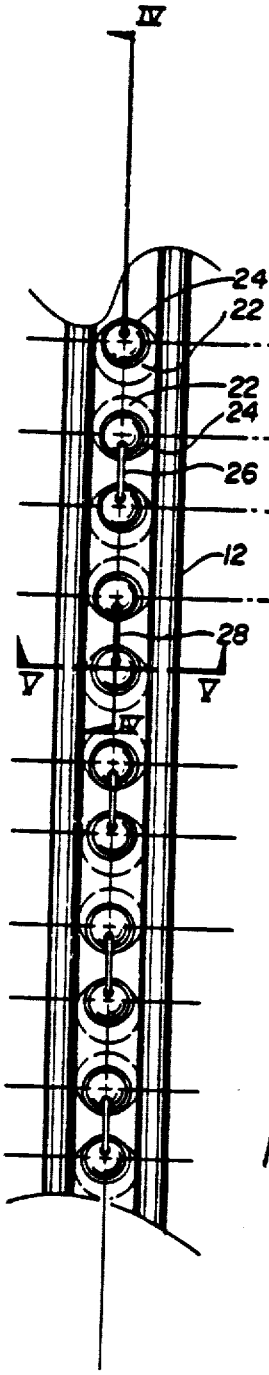
FIG. 3 is an enlarged view taken along the line III—III of FIG. 1.
Figure 4:
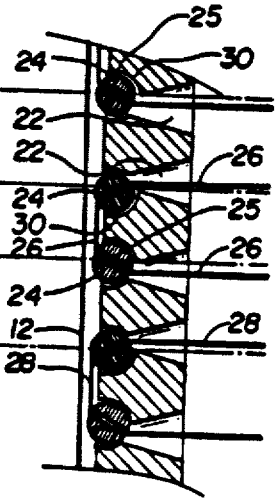
FIG. 4 is a sectional view taken along the line IV—IV of FIG. 3.

As shown in FIG. 2, the perimeter of frame 12 contains a plurality of spaced passages 22 running from the outside perimeter of frame 12 to the inside perimeter of frame 12. As seen in FIGS. 3 and 4, an element 24 rests in each spaced passage 22. Each element has a radial passage 25. The strings 26 and 28 pass from the inner perimeter of frame 12, through one of the passages 22, through radial passage 25 in element 24, and then back through another radial passage 25 in element 24, and on through the outer perimeter of frame 12 through another passage 22 to the inner perimeter of frame 22.

Passages 22 have curvilinear shaped receptacles 30 on the outer perimeter of the frame into which elements 24 are correspondingly fit. As shown in FIG. 4, the elements 24 are offset in receptacles 30 so that when there is tension on strings 26 and 28, tending to pull elements 24 to the inner surface of apertures 22, the spacing between the strings 26 and 28 will be even. This is desirable for aesthetic purposes, but elements 24 need not necessarily be offset in receptacles 30, since the sports racquet will function satisfactorily even if the strings are unevenly spaced.

Figure 5:
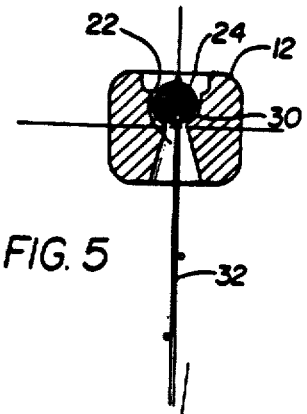
FIG. 5 is a sectional view taken along the line V—V of FIG. 3.
Figure 6:
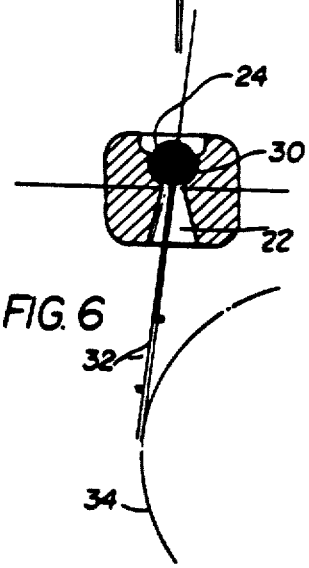
FIG. 6 is a sectional view taken along the line V—V of FIG. 3, showing the position of a string and an element of the racquet of the present invention after the playing surface is struck with a ball.

Preferably, passage 22 where it contacts the inner perimeter of the frame is wide enough so that string 32 does not contact the inner perimeter of the frame during play, as shown in FIGS. 5 and 6. Additionally, it is preferable that each passage lie on the same axis as the string that passes through that particular passage.

FIGS. 5 and 6 show the rotation of elements 24 in receptacles 30. FIG. 5 shows element 24, through which string 32 passes, in a resting position. In FIG. 6, a ball 34 has struck the playing surface 20, including string 32, at a substantially right angle. As string 32 moves in response to being struck by ball 34, element 24 rotates in receptacle 30, thereby permitting greater movement of string 32. As seen in FIG. 6, the passage 25 in element 24 is on a different axis after being struck by ball 34 than its stationary axis as shown in FIG. 5.

Since receptacles 30 are curvilinear, elements 24 can be of varying sizes for use with the same receptacle to vary the action on strings 18 passing through elements 24. Elements 24 of varying size will still have a spherical surface that will contact receptacles 30, thereby permitting rotation of elements 24. Moreover, varying the size of elements 24 will alter the action on strings 18, as a given force will produce different angles of rotation depending on the size of elements 24.

Figure 7:
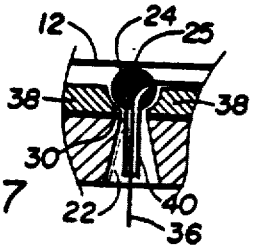
FIG. 7 is a sectional view of an alternative embodiment of the present invention showing an element with a non-radial passage.

FIG. 7 shows an alternative embodiment in which the passage 25 of elements 24 is curved rather than radical and in which element 24 rests in a separate sleeve or grommet 38 with a formed receptacle 30, rather than resting in an integrally formed receptacle 30 in the frame 12 as depicted in FIG. 4. With a curved passage 25, the tension on string 36 running through passage 25 does not change the natural position in which element 24 rests, unlike the elements 24 shown in FIG. 4, whose radial passages rest at an angle with respect to strings 26 and 28 because of the tension on strings 26 and 28. Thus, in the embodiment shown in FIG. 7, there is no need to offset elements 24 in grommet 38, and grommet 38 may be symmetrically shaped, Additionally, sleeve 40 is integral to element 24, and may be of varying length to provide for different action on strings 18.

Figure 8:
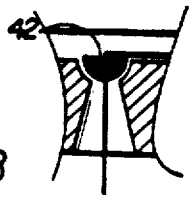
FIG. 8 is a sectional view of an alternative embodiment of the present invention showing a hemispherical element.
Figure 9:
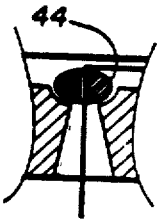
FIG. 9 is a sectional view of an alternative embodiment of the present invention showing an [eliptical] *ellipsoidal* element.

FIG. 8 shows another alternative embodiment in which element 42 is hemi-spherical rather than spherical as are elements 24 in the preferred embodiment shown in FIGS. 1-6. Similarly, FIG. 9 shows another alternative embodiment in which element 44 is [elliptical] *ellipsoidal* . These alternative embodiments are provided by means of illustration only, and the invention is not to be limited to any particular shaped element. Any shape of element capable of movement in response to a force applied to the playing surface 20 is within the scope of the present invention.

The elements of the present invention are preferably comprised of plastic materials such as acetal, which is a generic name for polyoxymethylene type acetal resin made by the polymerization of formaldehyde. Such materials generally have a hardness ranging from about R85 to R120 on the Rockwell hardness scale. The elements may also be comprised of metals, or a composite of plastic and metal.

The passages 25 in elements 24 may be formed by conventional drilling means or injection [moulding] *molding* methods. Similarly, the racquet of the present invention may be strung on a conventional stringing machine, the only difference being that the strings are inserted through passages 25 in elements 24 during stringing. Thus, the elements of the present invention may be included as original equipment on sports racquet, or may be added to sports racquets in the hands of the public when such racquets are restrung.

The foregoing description demonstrates that the sports racquet of the present invention provides significant advantages over those previously known in the art. The elements of the present invention are inexpensive and simple to construct, yet when added to a conventional sports racquet, they greatly increase playability of the racquet and reduce the vibration that is transferred from the racquet to the player's arm, particularly when a ball strikes the racquet off-center.

It should be apparent to those skilled in the art that other sports racquets might be constructed without departing from the spirit and scope of the present invention. Thus, the foregoing description is meant for illustrative purposes only. The present invention is not intended to be limited in any way, except as by the appended claims.

I claim:

1. A sports racquet comprising:

(a) a handle (b) a frame attached to or integral with said handle, said frame having an inner perimeter and an outer perimeter, and having a plurality of spaced frame passages disposed in the frame and extending between the inner perimeter and the outer perimeter thereof for receiving strings;

(c) strings disposed within said frame in a generally cross-networked array to form a playing surface; said strings extending through said frame passages; and (d) a plurality of elements contacting and resting on the outer perimeter of said frame, the surface of said elements that contacts the outer perimeter of said frame being convex, such that the location of each element with respect to the frame is fixed, each element having a passage extending through said element for receiving said strings, *each element having a bottom portion on its outer surface that is closest to the center of said playing surface and a top portion on its outer surface that is further from the center of said playing surface, each element having a rotational axis that is generally parallel to said playing surface and generally orthogonal to the string received in said element,* each of said elements being aligned with one of said frame passages such that each of said strings passes through said frame passage and said element passage so that said strings are prevented from contacting the frame, said elements being positioned such that, *when a sufficient force is applied to said playing surface in a direction generally perpendicular to said playing surface,* the axis of said element passage moves, but the location of said element with respect to the frame does not change, [when a sufficient force is applied to said playing surface in a direction generally perpendicular to said playing surface] *the top portion of said element rotating about the rotational axis of said element toward a direction opposite to the direction of application of the force.*

2. The sports racquet of claim 1 wherein said elements have a substantially spherical shape.

3. The sports racquet of claim 2 wherein said elements are about one eighth inch to about one half inch in diameter.

4. The sports racquet of claim 1 wherein said elements have a substantially hemispherical shape.

5. The sports racquet of claim 4 wherein the spherical portion of said elements has a radius of about one sixteenth inch to about one quarter inch.

6. The sports racquet of claim 1 wherein said elements have a substantially [elliptical] *ellipsoidal* shape, each of said elements being aligned such that its major axis extends along the outer perimeter of said frame along a line that is parallel to a line tangent to the outer perimeter of said frame at the point of contact between the element and the frame *generally parallel to said playing surface and generally orthogonal to the string received in said element.*

7. The sports racquet of claim 1 wherein said elements have a hardness ranging from about R-85 to about R-120 on the Rockwell hardness scale.

8. The sports racquet of claim 1 wherein said elements are made of plastics or metals or a composite of both.

9. The sports racquet of claim 1 wherein the passage through said element is linear.

10. The sports racquet of claim 1 wherein the outer perimeter of the frame has a plurality of concave surfaces located at the outer end of each frame passage to matingly receive the convex surface of each element.

11. The sports racquet of claim 10 wherein a sleeve extends from said element toward the inner perimeter of said frame.

12. The sports racquet of claim 1 wherein the portion of said frame passages on the inside perimeter of said frame are of sufficient diameter such that said strings do not contact the frame when said sufficient force is applied to said playing surface.

13. A sports racquet comprising:

(a) a handle (b) a frame attached to or integral with said handle, said frame having an inner perimeter and an outer perimeter, and having a plurality of spaced frame passages disposed in the frame and extending between the inner perimeter and the outer perimeter thereof for receiving strings;

(c) strings disposed within said frame in a generally cross-networked array to form a playing surface; said strings extending through said frame passages; and (d) a plurality of elements contacting and resting on the outer perimeter of said frame, such that the location of each element with respect to the frame is fixed, each element having a passage extending through said element for receiving said strings, *each element having a bottom portion on its outer surface that is closet to the center of said playing surface and a top portion on its outer surface that is further from the center of said playing surface, each element having a rotational axis that is generally parallel to said playing surface and generally orthogonal to the string received in said element,* each of said elements being aligned with one of said frame passages such that each of said strings passes through said frame passage and said element passage so that said strings are prevented from contacting the frame, said elements having a cylinder integral therewith extending from said elements, said cylinder having an internal passage along its major axis that is aligned with said element passage, said elements being positioned such that, *when a sufficient force is applied to said playing surface in a direction generally perpendicular to said playing surface,* the axis of said element passage moves, but the location of said element with respect to the frame does not change, [when a sufficient force is applied to said playing surface in a direction generally perpendicular to said playing surface] *the top portion of said element rotating about the rotational axis of said element toward a direction opposite to the direction of application of the force.*

14. A sports racquet comprising:

(a) a handle;

(b) a frame attached to or integral with said handle, ssaid frame having an inner perimeter and an outer perimeter, and having a plurality of spaced frame passages disposed in the frame and extending between the inner perimeter and the outer perimeter thereof for receiving strings;

(c) strings disposed within said frame in a generally cross-networked array to form a playing surface; said strings extending through said frame passages; and (d) a plurality of elements contacting and resting on the outer perimeter of said frame such that the location of each element with respect to the frame is fixed, each element having a non-linear passage extending through said element for receiving said strings, *each element having a bottom portion on its outer surface that is closet to the center of said playing surface and a top portion on its outer surface that is further from the center of said playing surface, each element having a rotational axis that is generally parallel to said playing surface and generally orthogonal to the string received in said element,* each of said elements being aligned with one of said frame passages such that each of said strings passes through said frame passage and said element passage so that said strings are prevented from contacting the frame, said elements being positioned such that, *when a sufficient force is applied to said playing surface in a direction generally perpendicular to said playing surface,* the axis of said element passage moves, but the location of said element with respect to the frame does not change, [when a sufficient force is applied to said playing surface in a direction generally perpendicular to said playing surface] *the top portion of said elements rotating about the rotational axis of said element toward a direction opposite to the direction of application of the force.*

15. A sports racquet comprising:

(a) a handle (b) a frame attached to or integral with said handle, said frame having an inner perimeter and an outer perimeter, and having a plurality of spaced frame passages disposed in the frame and extending between the inner perimeter and the outer perimeter thereof for receiving strings;

(c) strings disposed within said frame in a generally cross-networked array to form a playing surface; said strings extending through said frame passages; and (d) a plurality of elements contacting and resting on the outer perimeter of said frame such that the location of each element with respect to the frame is fixed, each element having a passage extending through said element for receiving said strings, *each element having a bottom portion on its outer surface that is closet to the center of said playing surface and a top portion on its outer surface that is further from the center of said playing surface, each element having a rotational axis that is generally parallel to said playing surface and generally orthogonal to the string received in said element,* each of said elements being aligned with one of said frame passages such that each of said strings passes through said frame passage and said element passage so that said strings are prevented from contacting the frame, each of said spaced passages being on the same axis as the string that passes through that particular passage, said elements being positioned such that *when a sufficient force is applied to said playing surface in a direction generally perpendicular to said playing surface,* the axis of said element passage moves, but the location of said element with respect to the frame does not change, [when a sufficient force is applied to said playing surface in a direction generally perpendicular to said playing surface] *the top portion of said element rotating about the rotational axis of said element toward a direction opposite to the direction of application of the force.*

16. A sports racquet comprising:

(a) a handle (b) a frame attached to or integral with said handle, said frame having an inner perimeter and an outer perimeter, and having a plurality of spaced frame passages disposed in the frame and extending between the inner perimeter and the outer perimeter thereof for receiving strings and having a receptacle portion;

(c) strings disposed within said frame in a generally cross-networked array to form a playing surface, said strings extending through said frame passages; and (d) a plurality of spherical elements contacting and resting on the outer perimeter of said frame such that the location of each element with respect to the frame is fixed, each element having a passage extending through said element for receiving said strings each of said elements contacting the receptacle portion of said frame passages such that each of said strings passes through said frame passage and said element passage, so that said strings are prevented from contacting said frame, said elements being positioned such that said elements rotate when a sufficient force is applied to said playing surface in a direction generally perpendicular to said playing surface.

*17. In a sports racquet comprising a handle; a frame attached to or integral with the handle; the frame having an inner perimeter and an outer perimeter, and having a plurality of spaced frame passages disposed in the frame and extending between the inner perimeter and the outer perimeter for receiving strings; strings disposed within the frame in a generally cross-networked array to form a playing surface; the strings extending through the frame passages; wherein the improvement comprises the provision of:*

*(a) a plurality of elements contacting and resting on the outer perimeter of the frame;*

*(b) receptacle means in the outer perimeter of the frame for fixing the location of each element with respect to the frame;*

*(c) each element having passageway means extending through the element for receiving a portion of the strings, each element having a bottom portion on its outer surface that is closest to the center of said playing surface and a top portion on its outer surface that is further from the center of said playing surface, each element having a rotational axis that is generally parallel to said playing surface and generally orthogonal to the string received in said element;*

*(d) each element having alignment means for aligning the element with the frame passages such that each of the strings passes through the frame passage and the passageway to prevent the strings from contacting the frame;*

*(e) the receptacle means positioning the elements such that when a sufficient force is applied to the playing surface in a direction generally perpendicular to the playing surface, the top portion of said element rotating about the rotational axis of said element toward a direction opposite to the direction of application of the force.*

*18. The improved sports racquet of claim 17 at least a first portion of each element has a curvilinear shape.*

*19. In a frame for a sports racquet the frame having an inner perimeter and an outer perimeter, and having a plurality of spaced frame passages disposed in the frame and extending between the inner perimeter and the outer perimeter; strings disposed within the frame in a generally cross-networked array to form a playing surface; the strings extending through the frame passages; wherein the improvement comprises the provision of:*

*a plurality of elements contacting and resting on the outer perimeter of the frame, each element having at least one element passage extending through the element for receiving the strings, each element passage having an axis, each of the elements having at least one bearing portion, which is aligned with one of the frame passages such that each of the strings passes through the frame passage and the element passage so that the strings are prevented from contacting the frame, receptacles in the outer perimeter for receiving the elements, the receptacles having curvilinear surfaces corresponding to the shape of a seating portion for receiving the bearing portion, each element having a bottom portion on its outer surface that is closest to the center of said playing surface and a top portion on its outer surface that is further from the center of said playing surface, each element having a rotational axis that is generally parallel to said playing surface and generally orthogonal to the string received in said element, the elements being positioned such that, when a sufficient force is applied to the playing surface in a direction generally perpendicular to the playing surface, the axis of the element passage moves, but the location of the element with respect to the frame does not change, the top portion of said element rotating about the rotational axis of said element toward a direction opposite to the direction of application of the force.*

*20. In a frame for a sports racquet the frame having an inner perimeter and an outer perimeter, and having a plurality of spaced frame passages disposed in the frame and extending between the inner perimeter and the outer perimeter; strings disposed within the frame in a generally cross-networked array to form a playing surface; the strings extending through the frame passages; wherein the improvement comprises the provision of:*

*a plurality of elements contacting and resting on the outer perimeter of the frame, each element having at least one element passage extending through the element for receiving the strings, each element passage having an axis; each of the elements having at least one bearing portion, which is aligned with one of the frame passages such that each of the strings passes through the frame passage and the element passage so that the strings are prevented from contacting the frame, receptacles in the outer perimeter for receiving the elements, the receptacles having curvilinear seating surfaces for receiving a bearing portion, the elements being positioned such that the axis of the element passage moves when a sufficient force is applied to the playing surface in a direction generally perpendicular to the playing surface.*

*21. The sports racquet of claim 1 wherein the outer perimeter of said frame has a plurality of curvilinear, concave receptacles for receiving the convex element, each element having an outer surface and each receptacle having an inner surface contacting the element's outer surface, the element's outer surface sliding along the receptacle's inner surface when the axis of said element passage moves.*

*22. The sports racquet of claim 10 wherein the convex surface of each element extends along the entire surface of each element facing the outer perimeter of said frame, said concave surfaces at the outer end of each frame passage extending substantially around the concave surface.*

*23. In a sports racquet comprising a handle; a frame attached to or integral with the handle; the frame having an inner perimeter and an outer perimeter, and having a plurality of spaced frame passages disposed in the frame and extending between the inner perimeter and the outer perimeter for receiving strings; strings disposed within the frame in a generally cross-networked array to form a playing surface; the strings extending through the frame passages; wherein the improvement comprises the provision of:*

*(a) a plurality of elements contacting and resting on the outer perimeter of the frame;*

*(b) at least one receptacle in the outer perimeter of the frame;*

)c) *each element having at least one passageway extending through the element for receiving a portion of the strings;*

(*d*) *each element having a bottom portion on its outer surface that is closest to the center of said playing surface and a top portion on its outer surface that is further from the center of said playing surface, each element having a rotational axis that is generally parallel to said playing surface and generally orthogonal to the string received in said element;*

(*e*) *each element being aligned with the frame passages such that each of the strings passes through the frame passage and the passageway to prevent the strings from contacting the frame;*

(*f*) *the receptacle positioning the elements such that when a sufficient force is applied to the playing surface in a direction generally perpendicular to the playing surface, the top portion of said element rotating about the rotational axis of said element toward a direction opposite to the direction of application of the force.*

* * * * *